United States Patent [19]
Heren

[11] Patent Number: 4,856,823
[45] Date of Patent: Aug. 15, 1989

[54] COUPLING WITH IMPROVED LOCKING/UNLOCKING MEMBER

[75] Inventor: Lawrence P. Heren, Peoria, Ill.

[73] Assignee: L. R. Nelson Corporation, Peoria, Ill.

[21] Appl. No.: 214,517

[22] Filed: Jul. 1, 1988

[51] Int. Cl.⁴ .............................................. F16L 37/12
[52] U.S. Cl. .................................... 285/81; 285/308; 137/533.17
[58] Field of Search .................... 285/308, 314, 81, 82

[56] References Cited

U.S. PATENT DOCUMENTS 2,023,428 12/1935 Liebhardt .
2,097,628 11/1937 Liebhardt .
3,468,562 9/1969 Chow et al. .
3,990,727 11/1976 Gallagher .
4,162,092 7/1979 Hayes .
4,185,655 1/1980 Wilkes et al. .
4,429,906 2/1984 Spadotto et al. .
4,541,657 9/1985 Smyth .
4,561,682 12/1985 Tisserat .
4,591,192 5/1986 Van Exel et al. .
4,641,859 2/1987 Walters ............................ 285/308 X
4,660,803 4/1987 Johnston et al. .

Primary Examiner—Thomas F. Callaghan
Attorney, Agent, or Firm—Cushman, Darby & Cushman

[57] ABSTRACT

A female assembly of a quick connect/disconnect coupling including an annular locking/unlocking member molded in a thin wall construction of plastic material such that the annular member is capable of resilient flexure such that a manual movement applied to a pair of diametrically opposed unlocking portions in a direction to move the same radially together has the effect of moving a pair of diametrically opposed locking portions displaced 90° from the unlocking portions radially outwardly. The locking/unlocking member is separate from and is mounted on an annular structure axially inwardly of an open end of the female assembly with the locking portions extending normally in a position to lock a tubular male member in an operative position therein or to unlock the same. The locking/unlocking member is movable from its normal locking/unlocking position to a positive locking position when opposing forces are applied tending to move the coupling apart.

27 Claims, 2 Drawing Sheets

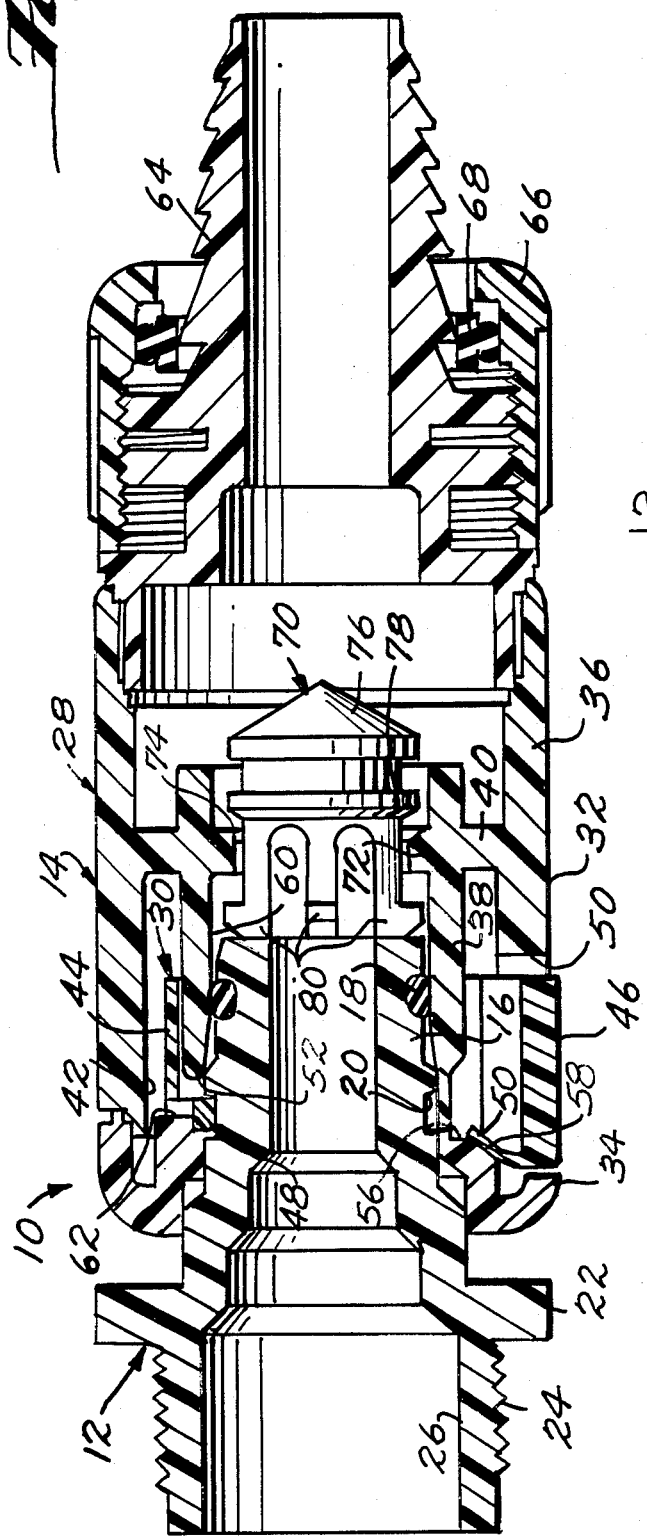

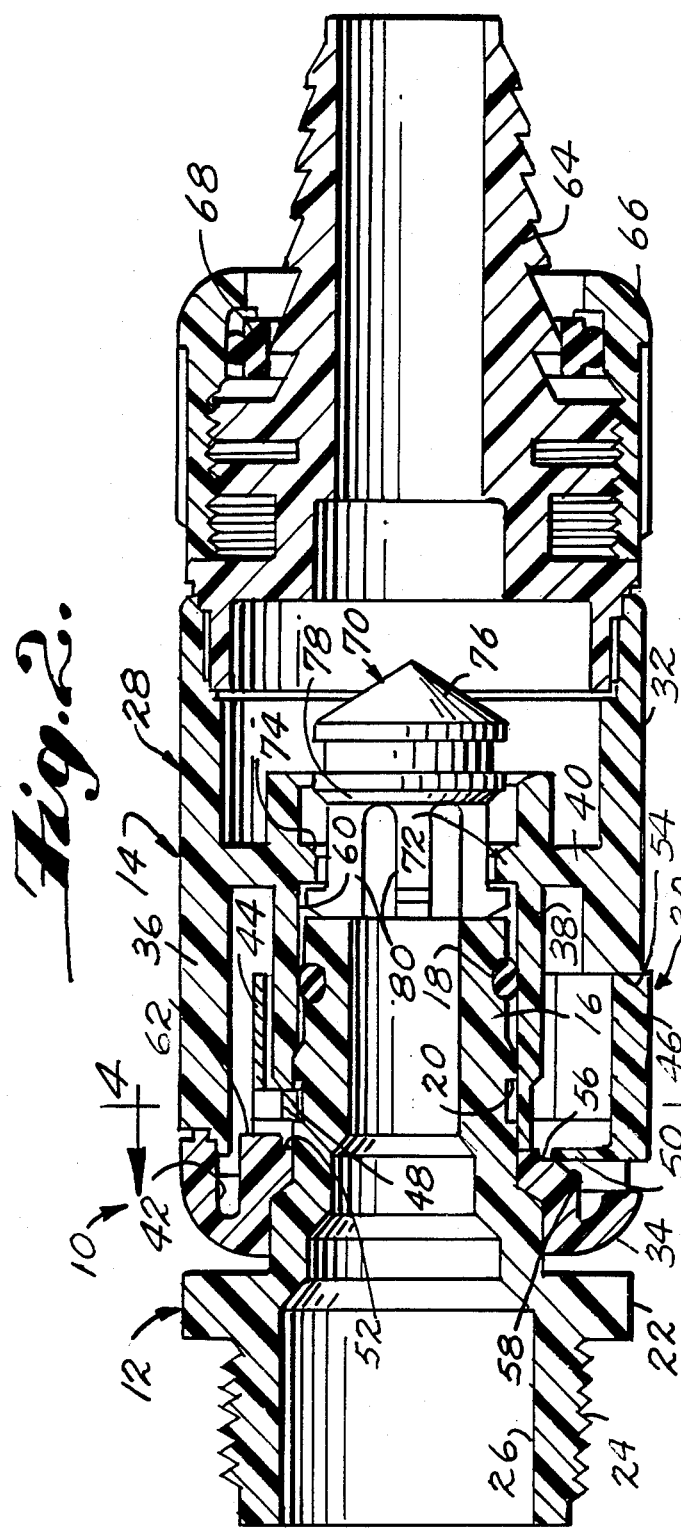

COUPLING WITH IMPROVED LOCKING/UNLOCKING MEMBER

This invention relates to hose couplers and, more particularly, to hose couplers of the quick connect-/quick disconnect type.

Quick connect/disconnect hose couplers are known and extensively used to provide a more convenient means of interconnecting hose ends than with the use of conventional screw threaded fittings. The usual type of quick connect/disconnect couplers include a tubular male member and a female assembly adapted for quick connect/disconnect with the male member. The male member includes a connecting end portion usually having an O-ring seal and an annular locking surface usually positioned axially inwardly of the O-ring seal and facing in a direction away from the O-ring seal. The female assembly includes an interior peripheral surface for receiving the connecting end portion of the male member including a cylindrical surface sealingly receiving the O-ring seal. The usual female assembly includes an axially slidably outer collar or sleeve which is spring biased toward the end of the female assembly into a locking position retaining locking elements (usually balls) in locking engagement with the annular locking surface of the male member. The couplers are released by moving the collar axially against the spring bias into a disconnect position wherein the locking elements can move outwardly out of locking engagement with the annular locking surface of the male member. These conventional axially movable collar type quick connect/disconnect couplers have the disadvantage that the female assembly includes four or more components including the plastic tubular body, the collar or sleeve, the metal coil spring and the locking element or elements. The nature and number of the components tended to add cost to the couplers.

There have been efforts to reduce the number of components (e.g. eliminate the metal coil springs and separate locking elements) and hence costs. See, for example, U.S. Pat. Nos. 4,429,906 and 4,660,803. Others have made efforts to reduce costs by eliminating the axially movable collar and providing instead a different digital mode of connect/disconnect with essentially a two-piece female assembly. See, for example, U.S. Pat. Nos. 4,541,657, 4,561,682, and 4,591,192. See also U.S. Pat. Nos. 2,023,428 and 2,097,628 for older versions of these different digital arrangements. The older expired patent versions have never made any commercial impact. The more recent patented efforts have met with varying degrees of market acceptance. U.S. Pat. No. 3,990,727 contains a disclosure of one piece construction. However, this configuration has not made any commercial impact. There is still a need for a commercially acceptable quick coupler which is cost effective when compared with the conventional spring pressed axially movable collar type.

It is an object of the present invention to fulfill the need outlined above. In accordance with the principles of the present invention, this objective is obtained by providing a female coupler assembly which includes an annular structure providing interior peripheral surfaces having one end adapted to receive a flow of water under pressure therethrough and an opposite end portion open to receive the connecting end portion of the male member in an operative position therein, including a cylindrical sealing surface for sealingly engaging the O-ring seal of the tubular male member when the latter is in its operative position, and a separate unitary thin walled annular locking/unlocking member molded of plastic material so as to provide a pair of locking portions disposed in normal positions of diametrically opposed relation and a pair of diametrically opposed unlocking portions disposed in normal positions of diametrically opposed relation displaced 90° with respect to the normal positions of said locking portions. The thin walled construction and plastic material of the locking-/unlocking member is such that the locking/unlocking member is capable of resilient flexure such that a manual movement of the unlocking portions radially relatively in a direction toward one another out of their normal positions results in the locking portions moving radially away from one another out of their normal positions. The annular locking/unlocking member is mounted on the annular structure axially inwardly of the opposite open end portion thereof in generally coaxial relation therewith (1) with the locking portions in their normal positions extending radially inwardly beyond the interior peripheral surfaces at positions of locking engagement with the annular locking surface of the male member when the latter is moved away from its operative position so as to lockingly prevent the same and (2) with the unlocking portions in their normal positions extending outwardly of the exterior of the annular structure so as to be capable of manual movement radially relatively toward one another out of their normal positions so that the resultant movement of the locking portions relatively away from one another out of their normal positions is sufficient to be out of positions of locking engagement with the annular locking surface of the male member.

Another object of the present invention is the provision of a quick connect/disconnect coupling of the type described which is simple in construction, effective in operation and economical to manufacture.

These and other objects of the present invention will become more apparent during the course of the following detailed description and appended claims.

The invention may best be understood with reference to the accompanying drawings wherein an illustrative embodiment is shown.

IN THE DRAWINGS

FIG. 1 is an end view of a female assembly embodying the principles of the present invention;

FIG. 2 is a sectional view taken along the line 2—2 of FIG. 1, showing the female assembly with a tubular male member in operative position therein;

FIG. 3 is a view similar to FIG. 2 showing the position of the female assembly with respect to the tubular male member when opposing forces are applied thereto in a direction to move the tubular male member out of its operative position;

FIG. 4 a sectional view taken along the line 4—4 of FIG. 2; and

FIG. 5 is a perspective view of the locking/unlocking member embodied in the female assembly.

Referring now more particularly to the drawings, there is shown in FIGS. 2 and 3 a quick connect/disconnect coupling, generally indicated at 10, embodying the principles of the present invention. The coupling 10 includes a tubular male member, generally indicated at 12, and a female assembly, generally indicated at 14. The male member 12 is of generally conventional construction and configuration. As shown, the tubular male member includes a connecting end portion 16 having an exterior periphery which includes an annular groove receiving an O-ring seal 18 therein. Spaced inwardly from the O-ring seal 18 is an annular flange presenting an annular locking surface 20 facing in a direction away from the O-ring seal 18. A flange 22 is formed on the inner end of the connecting end portion and the opposite end of the tubular male member 12 has its exterior provided with male threads 24 for threadedly engaging a conventional female hose fitting. The tubular male member 12 also includes an interior surface 26 defining a passage extending therethrough for confining a flow of water under pressure therethrough.

The female assembly 14 includes basically two components, one, an annular structure, generally indicated at 28, and the second, a locking/unlocking member, generally indicated at 30. The annular structure is preferably formed of a tubular body member 32 and a cap member 34 fixedly connected together. The tubular body member 32 includes an outer annular wall portion 36 and an inner annular wall portion 38 having a connecting wall portion 40 extending therebetween at a position spaced inwardly from the end thereof to which the cap member 34 is fixedly attached. The body member 32 and cap member 34 are preferably molded of a suitable plastic material, such as ABS. They are fixed together, as by sonic welding or the like.

The cap member 34 is of annular form having a generally U-shaped cross-sectional configuration the outer leg of which forms a continuation of the outer wall portion 36 and the inner leg of which forms a continuation of the inner wall portion 38. The wall portions 36, 38, and 40 of the body member 32 together with the cap member 34 define an annular chamber 42 within which the locking/unlocking member 30 is mounted.

As best shown in FIG. 5, the locking/unlocking member 30 is a separate unitary thin-walled annular member molded of plastic material, as for example acetyl. As shown, the locking/unlocking member 30 is preferably in the form of a pair of opposed arcuate wall sections 44 having ends integrally joined in spaced relation with a pair of digitally engageable pad sections 46 constituting unlocking portions of the member 30. The locking member 30 includes locking portions 48 in the form of U-shaped sections joined inwardly at the free ends of their legs with the central portions of the arcuate wall sections 44 and extending radially inwardly therefrom. The member 30 is molded such that as it is normally constituted the locking portions 48 are disposed in diametrically opposed relation with respect to one another and the unlocking portions 46 likewise are disposed in their normal positions in diametrically opposed relation, displaced 90° from the normal positions of the locking portions 48. The thin-wall construction and plastic material of the locking/unlocking member 30 is such that the member is capable of resilient flexure such that a manual movement of the unlocking portions 46 radially relatively in a direction toward one another out of their normal positions results in the locking portions 48 moving radially away from one another out of their normal positions. In this regard, it will be noted that the unlocking portions 46 in their normal positions are spaced radially apart a distance greater than the radial spacing between the locking portions 48 in their normal positions. It will also be noted that the pad sections 46 extend axially outwardly of the arcuate sections 44 at one end. Formed on these extensions is a pair of spring sections 50 which are cantilevered in a direction toward one another.

As previously indicated, the locking/unlocking member 30 is mounted within the chamber 42. In order to accommodate the locking portions 48 of the member 30, the juncture between the inner wall portion 38 of the body member 32 and the cap member 34 are notched to provide diametrically opposed apertures or openings 52 through which the locking portions 48 extend in a radially inward direction. Similarly, the juncture between the outer wall portion 36 of the body member 32 and the cap member 34 are notched to provide diametrically opposed openings 54 for receiving the pad sections or unlocking portions 46 of the member 30.

As best shown in FIGS. 2, 3, and 4, the cap member 34 is formed with a pair of recesses 56 for receiving the inner end portions of the spring sections 50. These recesses have radially outer ramp surfaces 58 leading thereto, the arrangement being such that the engagement of the inner ends of the spring sections 50 within the recesses 56 serve to bias the locking/unlocking member in a normal locking/unlocking position wherein the locking portions 48 extend radially inwardly beyond a cylindrical surface 60 formed on the inner wall portion 38 as a part of the inner peripheral surface of the annular structure 28 which is open to receive the connecting end portion 16 of the tubular male member 12 in an operative position therein. The openings 52 and 54 for the locking portions 48 and the unlocking portions 46 of the member 30 are elongated in an axial direction toward the cap member 34 so as to allow a limited amount of axial movement in that direction out of the normally biased operative position of the member 30, during which the spring sections 50 are flexed against the ramp surfaces 58.

Such a yielding movement would take place when opposing forces are applied to the tubular male member 12 and the female assembly 14 such as when a pull is exerted on the hose through the coupling 10 tending to move the male member 12 out of its operative position. This movement is transmitted to and resisted by the locking portions 48 of the member 30 by virtue of the engagement of the inner locking surfaces thereof with the annular locking surface 20 of the male member 12. During this movement, the U-shaped locking portions 48 and the entire locking/unlocking member 30 except for spring sections 50 yieldingly move axially into a positive locking position wherein the locking portions 48 are disposed in inwardly surrounding relation to a pair of positive locking lugs 62 formed on the cap member 34 at positions within the leading end of the openings 52. When in inwardly surrounding relation with the lugs 62, the locking portions 48 are positively prevented from moving radially outwardly. Moreover, the locking/unlocking member 30 and its locking portions 48 will remain in this positive locking position so long as the opposing forces are applied. However, when released, the spring force of the spring sections 50 is sufficient to bias the locking/unlocking member 30 and the coupling itself back into its normally locking/unlocking position.

It will be understood that the end portion of the body member 32 opposite from the end which is connected with the cap member 34 is provided with means for connecting the same with the end of a garden hose or the like. In the embodiment shown, the means takes the form of an assembly for attachment to a hose end which does not have a fitting thereon. It will be understood that rather than an attachment of this type, the end of the annular structure 28 could be provided with a fitting suitable to interengage with a fitting on the end of the hose. Typically, the fitting on the end of the annular structure 28 would be simply female threads or a swivel female fitting. In the embodiment shown, the attaching means is constructed in accordance with the teachings of U.S. Pat. No. 4,162,092. As shown, there is included a tubular shank member 64 molded of plastic material and suitably fixed, as by sonic or spin welding, to the adjacent end of the outer annular wall portion 36 of the body member 32. The exterior surface of the tubular shank member 64 is configured to grippingly engage within the interior of the hose and a tubular collar member 66 is adapted to be disposed over the exterior of the hose end and is threadedly engaged on the shank member 64. In addition, a plurality of annular sizing members 68, only one of which is shown in the drawings, is provided to effect the grip with the hose if needed, all in accordance with the teachings of the aforesaid patent.

The drawings also illustrate that the female assembly 14 may include a water control valve, generally indicated at 70. The valve may be a manually controlled type, such as conventionally included in some couplings. A typical example is a ball valve operated by an exteriorly mounted control lever. However, as shown, the valve 70 is of the automatic type, that is, when the flow of water under pressure comes from the end of the annular structure 28 opposite from the end cap member 34, the valve 70 will serve as a check valve to retain the water under pressure within the annular structure until such time as the annular structure 28 receives the tubular male member 12. As shown, in order to accommodate the valve, the inner annular wall portion 38 of the body member 32 is formed with an inwardly extending annular flange 72 having an annular valve seat 74 formed on the surface thereof extending toward the fitting end of the annular structure 28. The automatic check valve 70 includes a valve body 76 having an annular valve seat engaging surface 78 and a plurality of annularly spaced fingers 80 integrally joined with the valve body and extending axially therefrom through the interior of the annular flange 72. The fingers 80 are provided with retaining surfaces on the free end portions thereof disposed in normal positions radially outwardly of the interior annular flange and facing toward the interior annular flange 72. These surfaces retain the valve body 76 within the interior of the annular structure 28 for movement between open and closed positions with respect to the valve seat 74. The outer ends of the fingers 80 also include cam surfaces leading to the retaining surfaces which are operable to initially deflect the fingers 80 radially inwardly and then to allow the retaining surfaces to assume their normal positions when the fingers are moved through the annular flange. Finally, the ends of the fingers also include abutment surfaces engageable by the end surface of the tubular male member 12 when moved into its operative position to move the valve body 76 and its valve seat engaging surface 78 away from the valve seat 74 so as to permit communication of the water under pressure within the adjacent end of the annular structure 28 to pass through the annular flange 72 and into the interior 76 of the tubular male member 12. It will be noted that the engagement of the O-ring seal 18 with the interior cylindrical surface 60 prevents leakage of this water under pressure outwardly through the open end of the annular structure defined by the cap member.

With the female assembly 14 as shown, when the female assembly is connected with a hose end within which there is communicated a source of water under pressure, this water under pressure will contact the valve 70 and move the same into a position wherein the surface 78 engages the valve seat 74, thus retaining the water under pressure within the female assembly 14. The tubular male member 12 may be connected with any instrumentality with which it is desired to communicate water under pressure. For example, the other instrumentality could be another hose section leading to a sprinkler or to a hose nozzle, a sprinkler itself, a hose nozzle itself, or the like. The connection with the other instrumentality would include a female fitting which interengages with the male threads 24. The connection between the tubular male member 12 and female assembly 14 is accomplished by simply moving the tubular male member axially within the open interior of the female assembly 14. In this regard, it will be noted that the leading exterior surface of the tubular male member is tapered as is the leading surface of the annular locking flange which defines the annular locking surface 20. Similarly, the surfaces of the locking portions 48 facing the cap member 34 are tapered and these interior tapered surfaces like the exterior tapered surfaces on the tubular male member constitute cam surfaces which serve to cam the locking portions 48 radially outwardly with respect to one another as the tubular male member is moved axially within the female assembly 14. Moreover, the exterior surfaces provided by the locking flange on the tubular male member which extend from the tapered surface to the annular locking surface 20 engage similar surfaces extending axially from the interior tapered surfaces of the locking portions 48 to the locking surfaces thereof. The interengagement of these surfaces serves to retain the locking portions 48 in their unlocking positions until the two locking surfaces pass relatively beyond one another allowing the locking portions 48 to be biased into the exterior annular groove adjacent the locking surfaces 20.

In this operative position which is shown in FIG. 2, the locking surfaces of the locking portions 48 which face in a direction away from the cap member 34 are disposed in a position to engage the annular locking surface 20 of the tubular male member 12. It will also be noted that the O-ring seal 18 disposed inwardly of the annular locking surface 20 is disposed in sealing engagement with the cylindrical surface 60. Also, as previously indicated during the latter portion of the movement of the tubular male member into its operative position as shown in FIG. 2, the end surface of the tubular male member 12 will engage the end surfaces of the fingers 80 of the valve member 70 and move the same axially with the tubular male member within the female assembly 14 so as to provide a flow space between the annular surface 78 of the valve and the valve seat 74. In this way, fluid under pressure communicating with the female assembly 14 is allowed to communicate to the interior of the tubular male member 12 and leakage of this water under pressure outwardly through the interior of the female assembly is prevented by the engagement of the O-ring seal 18 with the cylindrical surface 60.

While it is possible to lock and unlock the coupling under pressure, it is greatly preferred to effect both of these actions while the coupling is not pressurized. Even where the coupling is provided with a check valve, which is not the more prevalent case, engagement and disengagement while the coupling is under pressure is difficult to accomplish without the escape of a spray of water under pressure which may land on the person effecting the operation.

It will be noted that when the coupling is connected with a hose to which a source of water under pressure is connected and the tubular male member is connected with an instrumentality such as a piston grip hose nozzle or the like where release of the trigger will close off communication downstream from the coupling, the water pressure thus trapped within the hose system and acting on the interior of the coupling will tend to move the tubular male member outwardly of the female assembly 14. This movement is resisted by the strength of the spring sections 50. Where the pressure is less than approximately to 40 to 45 psi, the spring is sufficiently strong to resist movement. As the contained source pressure increases to a value above approximately 15 to 20 psi, the strength of the spring sections 50 is no longer sufficiently great to resist relative movement and flexure of the spring sections takes place, allowing the member 30 to move into its positively locking position. Under these circumstances, if the operator desires to disconnect the hose, it becomes necessary to positively manually effect an axial movement out of its positive locking position and into its locking/unlocking position before the unlocking manual movement can be accomplished. Where the pressure is above approximately 50-55 psi, it becomes extremely difficult to effect such manual movement of the locking/unlocking member 30 out of its positive locking position. This functional feature reminds the user that the system is pressurized such that a manual unlocking of the coupling will probably result in water being sprayed on the operator. The difficulty in effecting the unlocking movement reminds the operator to relieve the pressure prior to unlocking. The arrangement is such that so long as there is water flowing through the coupling, unlocking can be readily accomplished during which an unwanted spray most likely would not be generated and the valve 70 would close to prevent further flow out of the female assembly 14 when the coupling is unlocked.

If during the time when the tubular male member 12 is in its operative position within the female assembly 14 and the coupling is not internally pressurized, a pull is exerted on either the instrumentality connected with the tubular male member 12 or the hose connected with the female assembly 14 and such pull is opposed there will be applied to the tubular male member 12 and the female assembly 14 opposing forces acting in a direction to move the tubular male member 12 out of its operative position. The application of these forces will cause a relative movement between the tubular male member 12 and the female assembly 14 during which the locking surfaces of the locking portions 48 will be engaged by the annular locking surface of the tubular male member. Further movement with these two surfaces interengaged results in a relative movement of the locking portions 48 in a direction toward the cap member 34. During this movement, the resilient sections 50 of the locking/unlocking member 30 flex in the manner illustrated in FIG. 3 allowing the entire member 30 to assume a positive locking position within the annular structure 28 of the female assembly 14 during which the lugs 62 assume a position within the U-shaped locking portions 48, thus positively preventing their radially outward movement.

The resiliency of the spring sections 50 is such that when the opposing forces applied to the tubular male member 12 and the female assembly 14 are released, the spring sections 50 are of sufficient strength to effect a relative movement of the tubular male member 28 together with the locking/unlocking member 30 with respect to the annular structure 28 of the female assembly 14. In this way, the spring sections 50 serve to retain the locking/unlocking member 30 in its normal locking-/unlocking position unless the coupling is pressurized or there are either unusual opposing forces applied as aforesaid or both. Consequently, under usual conditions when it is desired to release or uncouple the tubular male member 12 from the female assembly 14, the operator simply engages the two locking portions 46 manually between thumb and index finger and presses the same together so as to effect a relative radial movement thereof toward one another. This radial movement causes the annular locking/unlocking member 30 to flex in such a way as to move the unlocking portions 48 radially apart to a position sufficient to allow the annular locking surface 20 on the tubular male member 12 to be moved axially outwardly of the interior of the female assembly without obstruction from the locking portions 48. In the unusual case where unlocking takes place with the coupling internally pressurized, as the tubular male member 12 is moved outwardly, the water under pressure within the fitting end of the annular structure 28 will cause the valve 70 to move to a closed position when the surface 78 engages the valve seat 74 to retain the water under pressure within the female assembly.

It thus will be seen that the objects of this invention have been fully and effectively accomplished. It will be realized, however, that the foregoing preferred specific embodiments have been shown and described for the purpose of illustrating the functional and structural principles of this invention and ar subject to change without departure from such principles. Therefore, this invention includes all modifications encompassed within the spirit and scope of the following claims.

What is claimed is:

1. An assembly for quick connect/disconnect with respect to a tubular male member including a connecting end portion having an interior for confining the flow of water under pressure therethrough and an exterior providing a sealing surface and an exterior annular locking surface facing in a direction away from said end portion, said assembly including an annular structure providing interior peripheral surface means having one end adapted to receive a flow of water under pressure therethrough and an opposite end portion open to receive the connecting end portion of the male member in an operative position therein, said interior peripheral surface means including a sealing surface in the opposite end portion thereof for sealingly engaging the sealing surface of the tubular male member when the latter is in its operative position so as to prevent leakage of water under pressure communicating between the interior of the male member and the one end of the interior peripheral surface means, a separate unitary thin walled annular locking/unlocking member molded of plastic material so as to provide a pair of locking portions disposed in normal positions of diametrically opposed relation and a pair of diametrically opposed unlocking portions disposed in normal positions of diametrically opposed relation displaced 90° with respect to the normal positions of said locking portions, the thin walled construction and plastic material of said locking/unlocking member being such that the locking/unlocking member is capable of resilient flexure such that a manual movement of said unlocking portions radially relatively in a direction toward one another out of their normal positions results in said locking portions moving radially away from one another out of their normal positions, and means mounting said annular locking/unlocking member on said annular structure axially inwardly of the opposite open end portion thereof in generally coaxial relation therewith (1) with said locking portions in their normal positions extending radially inwardly beyond said interior peripheral surface means at positions of locking engagement with the annular locking surface of the male member when the latter is moved away from its operative position so as to lockingly prevent the same and (2) with at least one of said unlocking portions in their normal positions extending outwardly of the exterior of said annular structure so as to be capable of manual movement radially relatively toward one another out of their normal positions so that the resultant movement of said locking portions relatively away from one another out of their normal positions is sufficient to be out of positions of locking engagement with the annular locking surface of the male member.

2. An assembly as defined in claim 1 wherein said locking portions include locking surfaces facing in a direction opposed to the annular locking surface of the male member when in its operative position and cam surfaces leading to said locking surfaces by which said locking portions are cammed out of their normal positions and then allowed to return to their normal positions when the male member is moved into its operative position.

3. An assembly as defined in claim 2 wherein said mounting means further serves to mount said annular locking/unlocking member on said annular structure for limited axial movement with respect thereto between a normally operative locking/unlocking position and a positive locking position, resilient means for (1) normally biasing said annular locking/unlocking member into its normal locking/unlocking position and (2) yielding to permit movement of said locking/unlocking member into its positive locking position in response to the application of opposing forces tending to move said annular structure and the male member in its operative position therein relatively in a direction away from the operative position thereof and means operable when said locking/unlocking member is in its positive locking position as a result of the application of opposing forces as aforesaid for positively preventing movement of said locking portions radially in a direction away from one another out of their normal positions.

4. An assembly as defined in claim 3 wherein said annular structure includes an annular body member and an annular cap member fixed to one end thereof, said body and cap members together providing an inner annular wall portion defining the opposite end portion of said interior peripheral surface means and an outer annular wall portion generally coextensively parallel with said inner annular wall portion and connected therewith at opposite ends so as to define therewith an annular chamber, said locking/unlocking member being mounted in said annular chamber with said locking portions in their normal positions extending radially inwardly through openings in said inner annular wall portion and said unlocking portions in their normal positions extending radially outwardly through openings in said outer annular wall portion.

5. An assembly as defined in claim 4 wherein said locking/unlocking member is in the form of a pair of opposed arcuate wall sections having ends integrally joined in spaced relation with digitally engageable pad sections constituting said unlocking portions, said locking portions being of U-shaped configuration joined integrally at the free ends of their legs with the central portion of said arcuate wall sections and extending radially inwardly therefrom.

6. An assembly as defined in claim 5 wherein the pad sections defining said unlocking portions in their normal positions are spaced radially apart a distance greater than the radial spacing between said locking portions in their normal positions.

7. An assembly as defined in claim 6 wherein said resilient means includes spring sections formed integrally with the central portion of said pad sections and extending radially inwardly toward one another in cantilever fashion.

8. An assembly as defined in claim 7 wherein said annular body member and annular cap member are initially separated so as to provide access to said annular chamber for the mounting of said locking/unlocking member therein and thereafter fixed together to mount said locking/unlocking member therein, said cap member providing (1) surfaces for engaging and flexing said cantilevered spring sections when said locking/unlocking member is moved into said positive locking position and (2) locking lugs of a size enabling the U-shaped locking portions to receive the same therein when said locking/unlocking member is moved into said positive locking position.

9. An assembly as defined in claim 1 wherein said annular structure includes an annular body member and an annular cap member fixed to one end thereof, said body and cap members together providing an inner annular wall portion defining the opposite end portion of said interior peripheral surface means and an outer annular wall portion generally coextensively parallel with said inner annular wall portion and connected therewith at opposite ends so as to define therewith an annular chamber, said locking/unlocking member being mounted in said annular chamber with said locking portions in their normal positions extending radially inwardly through openings in said inner annular wall portion and said unlocking portions in their normal positions extending radially outwardly through openings in said outer annular wall portion.

10. An assembly as defined in claim 9 wherein said locking/unlocking member is in the form of a pair of opposed arcuate wall sections having ends integrally joined in spaced relation with digitally engageable pad sections constituting said unlocking portions, said locking portions being of U-shaped configuration joined integrally at the free ends of their legs with the central portion of said arcuate wall sections and extending radially inwardly therefrom.

11. An assembly as defined in claim 10 wherein the pad sections defining said unlocking portions in their normal positions are spaced radially apart a distance greater than the radial spacing between said locking portions in their normal positions.

12. An assembly as defined in claim 1 wherein said locking/unlocking member is in the form of a pair of opposed arcuate wall sections having ends integrally joined in spaced relation with digitally engageable pad sections constituting said unlocking portions, said locking portions being of U-shaped configuration joined integrally at the free ends of their legs with the central portion of said arcuate wall sections and extending radially inwardly therefrom.

13. An assembly as defined in claim 12 wherein the pad sections defining said unlocking portions in their normal positions are spaced radially apart a distance greater than the radial spacing between said locking portions in their normal positions.

14. A quick connect/disconnect coupling for connecting/disconnecting two hose sections comprising
a tubular male member adapted to be connected to one hose section, and
an assembly adapted to be connected to the other hose section for quick connect/disconnect with respect to said tubular male member,
said male member including an interior for confining the flow of water under pressure therethrough and a connecting end portion having an exterior providing an O-ring seal and an exterior annular locking surface facing in a direction away from said end portion spaced axially inwardly of said O-ring seal,
said assembly including an annular structure providing interior peripheral surface means having one end adapted to receive a flow of water under pressure therethrough and an opposite end portion open to receive the connecting end portion of said male member in an operative position therein,
said interior peripheral surface means including a cylindrical sealing surface for sealingly engaging the O-ring seal of the tubular male member when the latter is in its operative position,
a separate unitary thin walled annular locking/unlocking member molded of plastic material so as to provide a pair of locking portions disposed in normal positions of diametrically opposed relation and a pair of unlocking portions disposed in normal positions of diametrically opposed relation displaced 90° with respect to the normal positions of said locking portions,
the thin walled construction and plastic material of said locking/unlocking member being such that the locking/unlocking member is capable of resilient flexure such that a manual movement of said unlocking portions radially relatively in a direction toward one another out of their normal positions results in said locking portions moving radially away from one another out of their normal positions, and
means mounting said annular locking/unlocking member on said annular structure axially inwardly of the opposite open end portion thereof in generally coaxial relation therewith (1) with said locking portions in their normal positions extending radially inwardly beyond said interior peripheral surface means at positions of locking engagement with the annular locking surface of the male member when the latter is moved away from its operative position so as to lockingly prevent the same and (2) with at least one of said unlocking portions in their normal positions extending outwardly of the exterior of said annular structure so as to be capable of manual movement radially relatively toward one another out of their normal positions so that the resultant movement of said locking portions relatively away from one another out of their norma positions is sufficient to be out of positions of locking engagement with the annular locking surface of the male member.

15. A coupling as defined in claim 14 wherein said locking portions include locking surfaces facing in a direction opposed to the annular locking surface of the male member when in its operative position and cam surfaces leading to said locking surfaces by which said locking portions are cammed out of their normal positions and then allowed to return to their normal positions when the male member is moved into its operative position.

16. A coupling as defined in claim 15 wherein said mounting means further serves to mount said annular locking/unlocking member on said annular structure for limited axial movement with respect thereto between a normally operative locking/unlocking position and a positive locking position, resilient means for (1) normally biasing said annular locking/unlocking member into its normal locking/unlocking position and (2) yielding to permit movement of said locking/unlocking member into its positive locking position in response to the application of opposing forces tending to move said annular structure and the male member in its operative position therein relatively in a direction away from the operative position thereof and means operable when said locking/unlocking member is in its positive locking position as a result of the application of opposing forces as aforesaid for positively preventing movement of said locking portions radially in a direction away from one another out of their normal positions.

17. A coupling as defined in claim 16 wherein said annular structure includes an annular body member and an annular cap member fixed to one end thereof, said body and cap members together providing an inner annular wall portion defining the opposite end portion of said interior peripheral surface means and an outer annular wall portion generally coextensively parallel with said inner annular wall portion and connected therewith at opposite ends so as to define therewith an annular chamber, said locking/unlocking member being mounted in said annular chamber with said locking portions in their normal positions extending radially inwardly through openings in said inner annular wall portion and said unlocking portions in their normal positions extending radially outwardly through openings in said outer annular wall portion.

18. A coupling as defined in claim 17 wherein said locking/unlocking member is in the form of a pair of opposed arcuate wall section having ends integrally joined in spaced relation with digitally engageable pad sections constituting said unlocking portions, said locking portions being of U-shaped configuration joined integrally at the free ends of their legs with the central portion of said arcuate wall sections and extending radially inwardly therefrom.

19. A coupling as defined in claim 18 wherein the pad sections defining said unlocking portions in their normal positions are spaced radially apart a distance greater than the radial spacing between said locking portions in their normal positions.

20. A coupling as defined in claim 19 wherein said resilient means includes spring sections formed integrally with the central portion of said pad sections and extending radially inwardly toward one another in cantilever fashion.

21. A coupling as defined in claim 20 wherein said annular body member and annular cap member are initially separated so as to provide access to said annular chamber for the mounting of said locking/unlocking member therein and thereafter fixed together to mount said locking/unlocking member therein, said cap member providing (1) surfaces for engaging and flexing said cantilevered spring sections when said locking/unlocking member is moved into said positive locking position and (2) locking lugs of a size enabling the U-shaped locking portions to receive the same therein when said locking/unlocking member is moved into said positive locking position.

22. A coupling as defined in claim 14 wherein said annular structure includes an annular body member and an annular cap member fixed to one end thereof, said body and cap members together providing an inner annular wall portion defining the opposite end portion of said interior peripheral surface means and an outer annular wall portion generally coextensively parallel with said inner annular wall portion and connected therewith at opposite ends so as to define therewith an annular chamber, said locking/unlocking member being mounted in said annular chamber with said locking portions in their normal positions extending radially inwardly through openings in said inner annular wall portion and said unlocking portions in their normal positions extending radially outwardly through openings in said outer annular wall portion.

23. A coupling as defined in claim 22 wherein said locking/unlocking member is in the form of a pair of opposed arcuate wall sections having ends integrally joined in spaced relation with digitally engageable pad sections constituting said unlocking portions, said locking portions being of U-shaped configuration joined integrally at the free ends of their legs with the central portion of said arcuate wall sections and extending radially inwardly therefrom.

24. A coupling as defined in claim 23 wherein the pad sections defining said unlocking portions in their normal positions are spaced radially apart a distance greater than the radial spacing between said locking portions in their normal positions.

25. A coupling as defined in claim 14 wherein said locking/unlocking member is in the form of a pair of opposed arcuate wall sections having ends integrally joined in spaced relation with digitally engageable pad sections constituting said unlocking portions, said locking portions being of U-shaped configuration joined integrally at the free ends of their legs with the central portion of said arcuate wall sections and extending radially inwardly therefrom.

26. An assembly as defined in claim 25 wherein the pad sections defining said unlocking portions in their normal positions are spaced radially apart a distance greater than the radial spacing between said locking portions in their normal positions.

27. An assembly for quick connect/disconnect with respect to a tubular male member including a connecting end portion having an exterior O-ring seal and an exterior annular locking surface facing in a direction away from said end portion, said assembly including an annular structure providing interior peripheral surface means for receiving the connecting end portion of the male member in an operative position therein, said interior peripheral surface means including a cylindrical sealing surface for sealingly engaging the O-ring seal of the tubular male member when the latter is in its operative position, a locking/unlocking member including unlocking means and locking means movable in response to a digital movement of said unlocking means, means mounting said locking/unlocking member on said annular structure (1) so that said locking means is disposed in a normal resiliently biased locking-/unlocking position extending radially inwardly beyond said interior peripheral surface means in locking engagement with the annular locking surface of the male member when the latter is moved away from its operative position so as to lockingly prevent the same and said unlocking means is disposed so as to be capable of a digital movement resulting in outward yielding movement of said locking means out of locking engagement with the annular locking surface of the male member, and (2) so that when said locking means is disposed in said normally operable locking/unlocking position and the male member is moved relatively away from its operative position said locking means is yieldingly moved thereby axially into a positive locking position, yieldable means for enabling the yielding movement of said locking means into said positive looking position operable to resiliently bias said locking means out of said positive locking position and into its locking/unlocking position when the force causing movement of said locking means into said positive locking position is removed, and means operable when said locking means is in said positive locking position as a result of the relative movement of the male member away from its operative position as aforesaid for positively preventing outward movement of said locking means out of locking engagement with the annular locking surface of said male member.

* * * * *